US007912074B2

(12) United States Patent
Cantwell

(10) Patent No.: US 7,912,074 B2
(45) Date of Patent: Mar. 22, 2011

(54) SYSTEM AND METHOD OF MULTIPLEXING DATA FROM MULTIPLE PORTS

(75) Inventor: Robert W. Cantwell, Lucas, TX (US)

(73) Assignee: Fujitsu Limited, Kawasaki (JP)

( * ) Notice: Subject to any disclaimer, the term of this patent is extended or adjusted under 35 U.S.C. 154(b) by 846 days.

(21) Appl. No.: 09/922,412

(22) Filed: Aug. 3, 2001

(65) Prior Publication Data

US 2002/0181486 A1 Dec. 5, 2002

Related U.S. Application Data

(60) Provisional application No. 60/295,147, filed on Jun. 1, 2001.

(51) Int. Cl.
*H04L 12/56* (2006.01)

(52) U.S. Cl. ......... 370/401; 370/535; 709/238; 709/249

(58) Field of Classification Search ................. 307/389, 307/422; 370/362, 415, 398, 537, 535, 540, 370/538, 422, 389
See application file for complete search history.

(56) References Cited

U.S. PATENT DOCUMENTS 6,014,708 A * 1/2000 Klish ............................ 709/232
6,163,527 A 12/2000 Ester et al.
6,222,848 B1 * 4/2001 Hayward et al. .............. 370/412
6,275,492 B1 8/2001 Zhang
6,337,861 B1 1/2002 Rosen
6,496,519 B1 * 12/2002 Russell et al. ................ 370/465
6,498,794 B1 * 12/2002 Tsukamoto et al. ....... 370/395.1
6,598,088 B1 * 7/2003 Lynch et al. .................. 709/238
6,707,789 B1 * 3/2004 Arslan et al. .................. 370/218
6,771,673 B1 * 8/2004 Baum et al. .................... 370/535
6,788,681 B1 * 9/2004 Hurren et al. ................. 370/389
6,862,380 B2 * 3/2005 Chaudhuri et al. ............. 385/17
6,996,125 B2 * 2/2006 Kfir et al. ...................... 370/466
7,002,976 B2 * 2/2006 Dupont ......................... 370/404
7,031,341 B2 * 4/2006 Yu ................................. 370/469
7,088,714 B2 * 8/2006 Athreya et al. ............... 370/389
2001/0043603 A1 * 11/2001 Yu ................................. 370/393
2002/0110124 A1 * 8/2002 Fujita ............................ 370/389
2002/0146026 A1 * 10/2002 Unitt et al. .................... 370/428
2002/0159438 A1 * 10/2002 Rumer .......................... 370/352
2002/0176450 A1 * 11/2002 Kong et al. ................... 370/539

(Continued)

OTHER PUBLICATIONS

World Wide Web, http://www.cis.ohio-state.edu/~jain/cis788-97/virtual_lans/index.htm, Suba Varadarajan, "Virtual Local Area Networks", printed on Feb. 7, 2000, 12 pages.

(Continued)

*Primary Examiner* — Daniel J Ryman
*Assistant Examiner* — Brian Roberts
(74) *Attorney, Agent, or Firm* — Gardere Wynne Sewell LLP; Marc A. Hubbard

(57) ABSTRACT

Telecommunication equipment of the present invention includes a switch for receiving data from a plurality of ports and inserting a unique port identifier in the data from each port to identify the source port of the data. The equipment also includes a multiplexer coupled to the switch and operable to multiplex the data from the plurality of ports into a single serial data stream. A method of the present invention includes the steps of receiving data from a plurality of ports, adding a unique port identifier to the data from each port to identify the port from which the data came, and multiplexing the data from the plurality of ports into a single data stream for transmission.

17 Claims, 1 Drawing Sheet

U.S. PATENT DOCUMENTS

2002/0191617 A1 * 12/2002 Duplessis et al. ............. 370/400

OTHER PUBLICATIONS

World Wide Web, http://www.ietf.org/internet-drafts/draft-ietf-mpls-arch-07.txt, Eric C. Rosen, "Multiprotocol Label Switching Architecture", printed on Jan. 9, 2001, 55 pages.

World Wide Web, http://www.ietf.org/internet-drafts/draft-ietf-mpls-generalized-rsvp-te-00Peter Ashwood-Smith, et al., "Generalized MPLS Signaling -RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages.

Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

SYSTEM AND METHOD OF MULTIPLEXING DATA FROM MULTIPLE PORTS

TECHNICAL FIELD OF THE INVENTION

This invention relates to telecommunications network and equipment, and more particularly, to a system and method of multiplexing data from multiple ports.

BACKGROUND OF THE INVENTION

The optical subscriber terminal is a customer premise equipment (CPE) that aggregates and transports both Ethernet and time-division multiplexed (TDM) customer traffic to and from a network routing device and the network beyond. Customer Ethernet traffic may include data at 10 Mb/s, 100 Mb/s or higher rates from customers' Ethernet local area networks, while TDM data may consist of data at DS3 (or STS-1) and T1 speeds. The customer traffic is aggregated into an optical uplink for transmission to the network routing device.

Typically, data from the Ethernet ports are multiplexed at the physical layer into multiple respective SONET STS-1 synchronous payload envelopes (SPEs) as a serial data stream. The serial data stream is converted into a SONET optical signal for transmission to the network routing device. The network routing device demulitplexes the serial data stream to recover data from each individual Ethernet port for processing by higher layer network equipment such as routers. This conventional method is inefficient in bandwidth utilization, because the data from each port is mapped into its respective SPE. The conventional method also requires substantial processing in the higher layer network equipment such as routers.

SUMMARY OF THE INVENTION

It may be seen that there is a need for a more efficient system and method of multiplexing data from several Ethernet ports at customer premises equipment for transport to a telecommunication network.

In accordance with an embodiment of the present invention, telecommunication equipment includes a switch for receiving data from a plurality of ports and inserting a unique port identifier in the data from each port to identify the source port of the data. The equipment also includes a multiplexer coupled to the switch and operable to multiplex the data from the plurality of ports into a single serial data stream.

In accordance with another embodiment of the present invention, a method includes the steps of receiving data from a plurality of ports, adding a unique port identifier to the data from each port to identify the port from which the data came, and multiplexing the data from the plurality of ports into a single data stream for transmission.

In accordance with yet another embodiment of the present invention, a method of multiplexing data from a plurality of ports for transmission includes the steps of receiving data from the plurality of ports, adding a unique port identifier to a predetermined header field of the data from each port to identify the port from which the data came, multiplexing the data from the plurality of ports into a single SONET synchronous payload envelope, and converting the multiplexed data into a SONET optical signal for transmission.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
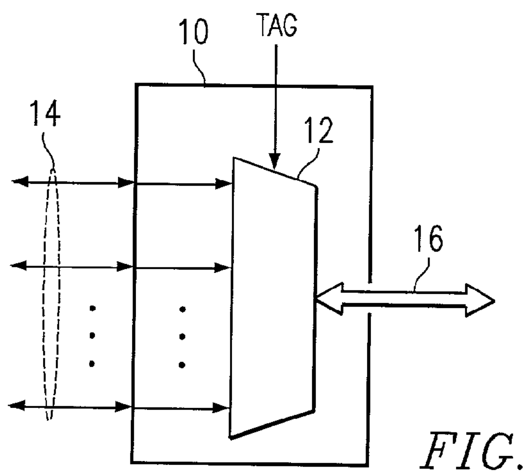
FIG. 1 is simplified block diagram of an embodiment of customer premise equipment operable to multiplex data from multiple ports into a single synchronous payload envelope according to the teachings of the present invention.
Figure 2:
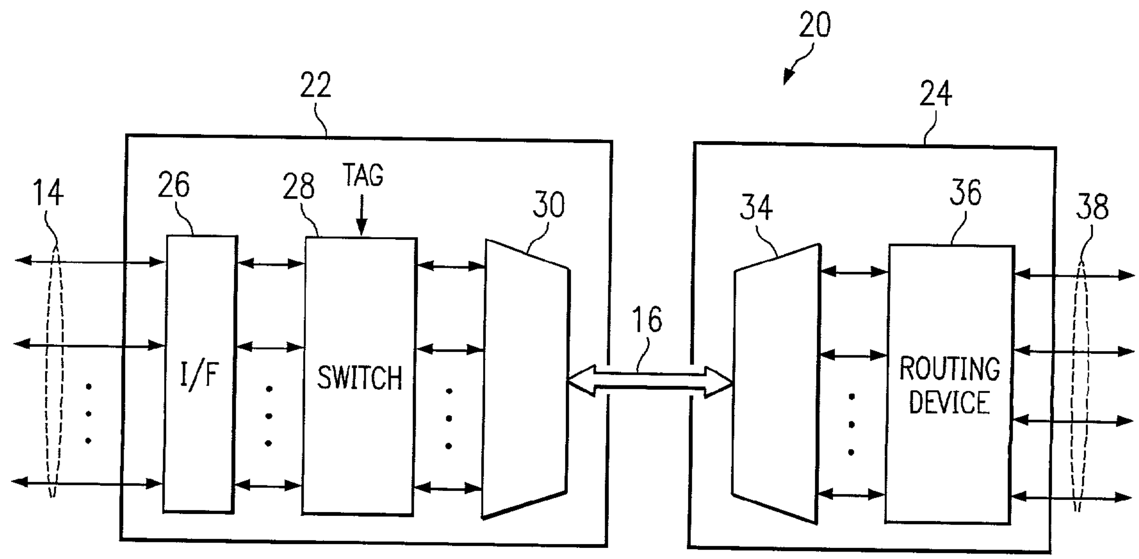
FIG. 2 is a more detailed block diagram of an embodiment of customer premise equipment operable to multiplex data from multiple Ethernet ports into a single synchronous payload envelope according to the teachings of the present invention.
Figure 3:
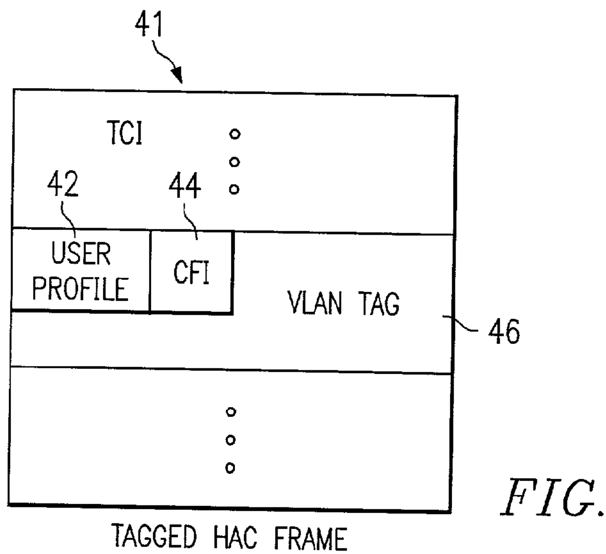
FIG. 3 is a diagram showing an embodiment of a tagged media access control (MAC) frame with the VLAN tag field used according to the teachings of the present invention.

The preferred embodiment of the present invention and its advantages are best understood by referring to FIGS. 1 through 3 of the drawings, like numerals being used for like and corresponding parts of the various drawings.

FIG. 1 is simplified block diagram of an embodiment of customer premise equipment 10 operable to multiplex data from multiple ports into a single synchronous payload envelope (SPE) according to the teachings of the present invention. Equipment 10 receives data from a plurality of ports 14 carrying data, such as Ethernet ports. Ethernet ports 14 may carry data at 10 Mb/s, 100 Mb/s, or higher rates. Equipment 10 includes a multiplexer device 12, which receives the data from the multiple Ethernet ports 14 and inserts a unique port identifier or tag identifying the source port the data originated. The tag is inserted into a predetermined data field in the header of the data. For example, a source port identifier tag may be inserted into a predetermined field in the Ethernet frame tag header. Multiplexer device 12 multiplexes the data from the multiple Ethernet ports into a single SPE transmitted as a serial data stream 16 to a telecommunication network (not shown). For example, serial data stream 16 may have SONET formatting in which data traffic from all the ports are multiplexed into a single SONET SPE instead of the data from each port being mapped into its own respective SPE. Bandwidth efficiencies are thus achieved.

FIG. 2 is a more detailed block diagram of an embodiment of customer premise equipment 22 operable to multiplex data from multiple Ethernet ports 14 into a single synchronous payload envelope according to the teachings of the present invention. Equipment 22 includes an Ethernet interface circuit 26 which receives data from multiple Ethernet ports. Ethernet interface circuit 26 includes transceivers, transformers and protection circuits as known in the art. A switch 28 receives the data from the plurality of ports and performs the primary functions of performing media access control, tagging all Ethernet frames with unique tags, and passing the tagged frames to a multiplexer/demultiplexer 30. Multiplexer/demultiplexer 30 then multiplexes the traffic into a single SONET STS21C SPE 16 for conversion to optical signals and transmission to a network routing device.

Referring to FIG. 3, a diagram showing an embodiment of a tagged media access control (MAC) frame 40 with a virtual local area network (VLAN) tag field 46 to be used according to the teachings of the present invention is shown. The tagged MAC frame format is described in detail in ANSI/IEEE Standard 802.3, 2000 Edition, *Local and Metropolitan Area Networks—Part* 3: *Carrier Sense Multiple Access with Collision Detection* (*CSMA/CD*) *Access Method and Physical Layer Specifications*. Tagged MAC frame 40 includes a number of fields, including a tag control information (TCI) field 41. Tag control information field 41 includes a 3-bit user priority field 42, a 1-bit canonical format indicator (CFI) field 44, and a 12-bit VLAN identifier (VID) field 46. As described in the IEEE Standard 802.3, the VID field is used to identify the virtual LAN that the frame belongs to. A virtual LAN is a logical identification of a logical segment of a LAN representing a broadcast domain. Virtual LANs are identified to reduce the traffic on the LAN because broadcast and multicast messages may be sent to users on the virtual LAN rather than the entire LAN. The VID is therefore traditionally used to identify the VLAN to which the sender and receiver of the data belong.

The present invention provides a different use of the VID field by inserting a unique tag or identifier to identify the source Ethernet port of the data. An optical subscriber access multiplexer 24 receiving the optical uplink traffic from customer premises equipment 22 includes a multiplexer/demultiplexer 34 that demultiplexes the serial data stream to recover each individual Ethernet port data based on the source port identifier or tag in VID field 46, and provides the data to a routing device 36. Routing device 36 routes the traffic based on the source port identifier, MAC address and IP address to its output 38. Because the identification of an Ethernet port in effect identifies a service subscriber, it is also possible to transmit and process the data traffic according to the subscriber service level agreement (SLA) and quality of service (QoS).

In the reverse direction, routing device 36 receives data and adds the unique source port tag based on the source IP address of the sending device of the data. Multiplexer/demultiplexer 34 then multiplexes the data into an STS21C SPE for transmission to equipment 22. Multiplexer/demultiplexer 30 of equipment 22 demultiplexes the SPE to produce an output to switch 28. Based on the source port tag, switch 28 switches the data to the proper destination Ethernet port 14.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. Telecommunication equipment, comprising:

a switch coupled with a plurality of Ethernet ports for receiving Ethernet data frames, each Ethernet data frame including a header information, the switch operable to insert without removing any existing header information a unique port identifier into a predefined header field of each Ethernet data frame from each one of the plurality of Ethernet ports to identify the Ethernet port from which each Ethernet data frame is received; and a multiplexer coupled to the switch and operable to multiplex the Ethernet data frames containing the port identifiers into a single serial data stream, the multiplexer being operable to multiplex the Ethernet data frames containing the port identifiers into a single synchronous payload envelope.

2. The telecommunication equipment, as set forth in claim 1, further comprising a subscriber access multiplexer operable to receive the single serial data stream from the multiplexer, demultiplex the single serial data stream into Ethernet data frames from each Ethernet port, and route the demultiplexed Ethernet data frames based on the unique port identifier.

3. Telecommunication equipment, comprising:

a switch having a plurality of ports for receiving data frames and switching the data frames to another plurality of ports, each data frame including a header information, the switch operable to insert a unique port identifier into a predefined header field of each data frame from each port to identify the port from which each data frame is received; and a multiplexer coupled to the switch and operable to multiplex the data frames containing the port identifiers into a single serial data stream, the multiplexer being operable to multiplex the data frames containing the port identifiers from the plurality of ports into a single synchronous payload envelope;

wherein the data frames are Ethernet data frames and the predefined header field includes a virtual local area network (LAN) field.

4. Telecommunication equipment, comprising:

a switch for receiving data frames from a first plurality of ports and switching the data frames to a second plurality of ports, each data frame including a header information, the switch operable to insert without removing any existing header information a port identifier into a predefined header field of each data frame to identify the port from which that data frame is received;

a multiplexer coupled to the switch and operable to multiplex the data frames containing the port identifiers into a first single serial data stream, the multiplexer being operable to multiplex the data frames containing the port identifiers into a single synchronous payload envelope;

a subscriber access multiplexer operable to receive data from a plurality of sender nodes in a network and operable to insert a port identifier into a predefined header field based on an internet protocol (IP) address of the sender node of the data, and multiplex the data into a second single serial data stream;

the multiplexer being operable to receive the second single serial data stream from the subscriber access multiplexer and demultiplex the data into a plurality of data frames; and the switch being operable to switch each of the demultiplexed data frames to the first plurality of ports based on the port identifier contained in each of the multiplexed data frames.

5. Telecommunication equipment, comprising:

a switch for receiving data frames from a first plurality of ports and switching the data frames to a second plurality of ports, each data frame including a header information, the switch operable to insert without removing any existing header information a unique port identifier into a predefined header field of each data frame to identify the port from which each data frame is received;

a multiplexer coupled to the switch and operable to multiplex the data frames containing the unique port identifiers into a single serial data stream, the multiplexer being operable to multiplex the data frames from the second plurality of ports into a single synchronous payload envelope; and a subscriber access multiplexer operable to receive the single serial data stream from the multiplexer and route each data frame to a destination network node based on the unique port identifier, a media access control (MAC) address, and internet protocol (IP) address in each data frame.

6. A method comprising:

receiving with a switch at a first node data frames from a plurality of Ethernet ports, each data frame including header information;

adding a unique port identifier to a predetermined field within the header information in each data frame from each Ethernet port, without removing header information, in order to identify the Ethernet port from which each data frame came; and multiplexing the data frames containing the unique port identifiers into a single data stream for transmission by a synchronous transmission medium to a second node.

7. The method, as set forth in claim 6, wherein multiplexing the data frames containing the unique port identifiers comprises multiplexing the data frames containing the unique port identifiers into a single synchronous payload envelope.

8. The method, as set forth in claim 6, further comprising converting the single data stream into synchronous optical network (SONET) optical signals for transmission.

9. The method, as set forth in claim 6, further comprising:

transmitting the single data stream by synchronous data transmission to the second node;

receiving the single data stream at the second node;

demultiplexing the single serial data stream at the second node into data frames from each Ethernet port; and routing each of the data frames from each Ethernet port based on the unique port identifier.

10. The method, as set forth in claim 6, further comprising:

receiving data frames at the second node from a plurality of sender nodes in a network;

inserting into each data frame received from the plurality of sender nodes a unique port identifier based on an IP address of the sender node of the data;

multiplexing the data frames received from the plurality of sender nodes, containing the unique port identifiers, into a single serial data stream for transmission;

transmitting the single serial data stream from the second node to the first node;

receiving at the first node the single serial data stream from the second node and demultiplexing the single serial data stream from the second node into data frames from each sender node; and switching at the first node the demultiplexed data frames based on the unique port identifier to the plurality of Ethernet ports.

11. The method, as set forth in claim 9, further comprising transmitting the single data stream over the synchronous transmission medium to to the second node and receiving the single data stream at the second node and routing the data frames to a destination network node based on the unique port identifier, a media access control (MAC) address, and an internet protocol (IP) address in each data frame.

12. A method comprising:

receiving data frames at a switch from a plurality of Ethernet ports, each data frame including header information;

adding a unique port identifier to the header information in each data frame from each Ethernet port to identify the Ethernet port from which each data frame came;

multiplexing the data frames containing the unique port identifiers into a single data stream for transmission by a synchronous transmission medium;

wherein adding the unique port identifier comprises inserting the unique port identifier into a virtual local area network identifier (VID) field and each data frame is a tagged media access control (MAC) data frame.

13. A method of multiplexing data from a plurality of Ethernet ports for transmission, comprising:

receiving data frames from the plurality of Ethernet ports, each data frame including header information containing at least destination addresses;

adding a unique port identifier to a predetermined header field of each data frame from each of the plurality of Ethernet ports, without removing any header information, to identify the Ethernet port from which each data frame came;

multiplexing the data frames containing the unique port identifiers into a single synchronous payload envelope; and converting the multiplexed data frames into a optical signal for transmission to a second node.

14. The method, as set forth in claim 13, further comprising:

receiving at the second node the optical signal and converting to a single data stream;

demultiplexing at the second node the data stream from each port into the data frames containing the unique port identifiers; and routing the demultiplexed data frames based on the unique port identifier.

15. A method of multiplexing data from a plurality of ports for transmission, comprising:

receiving data frames from the plurality of ports, each data frame including header information containing at least destination addresses;

adding a unique port identifier to a predetermined header field of each data frame from each port, without removing any header information, to identify the port from which the each data frame came;

multiplexing the data frames containing the unique port identifiers into a single synchronous payload envelope; and converting the multiplexed data frames into a optical signal for transmission;

wherein adding the unique port identifier comprises inserting the unique port identifier into a virtual local area network identifier (VID) field and each data frame is a tagged media access control (MAC) data frame.

16. A method comprising:

receiving at a first node a first plurality of data frames from a first plurality of ports, each data frame including header information containing at least a destination address;

adding a unique port identifier to a predetermined header field of each data frame from each port, without removing any header information, to identify the port from which each data frame came;

multiplexing the plurality of data frames containing the unique port identifiers into a single synchronous payload envelope;

converting the multiplexed data frames into a optical signal for transmission;

receiving at a second node a second plurality of data frames from a plurality of sender nodes in a network;

inserting into each of the second plurality of data frames a unique port identifier based on an internet protocol (IP) address of the sender node of the data;

multiplexing the second plurality of data frames from the plurality of sender nodes, containing the unique port identifiers, into a single serial data stream for transmission and transmitting the single data stream to the first node;

receiving at the first node the single serial data stream from the first second node and demultiplexing the second plurality of data frames in the single serial data stream from the second node into data frames from each sender node; and switching the demultiplexed data frames based on the unique port identifier to the first plurality of ports.

17. A method of multiplexing data from a plurality of ports at a first node for transmission to a second node, comprising:

receiving data frames from the plurality of ports at the first node, each data frame including header information containing at least destination addresses;

adding a unique port identifier to a predetermined header field of each data frame from each port, without removing any header information, to identify the port from which each data frame came;

multiplexing the data frames containing the unique port identifiers into a single synchronous payload envelope; and converting the multiplexed data frames into a optical signal for transmission to the second node;

transmitting the single synchronous payload envelope to the second node; and receiving the multiplexed data frames containing the unique port identifiers at the second node, demultiplexing the data frames containing the unique port identifiers and routing each data frame to a destination network node based on the unique port identifier, a media access control (MAC) address, and internet protocol (IP) address in each data frame.

* * * * *

UNITED STATES PATENT AND TRADEMARK OFFICE

CERTIFICATE OF CORRECTION

PATENT NO. : 7,912,074 B2
APPLICATION NO. : 09/922412
DATED : March 22, 2011
INVENTOR(S) : Robert W. Cantwell It is certified that error appears in the above-identified patent and that said Letters Patent is hereby corrected as shown below:

In the Claims:

At column 5, claim number 10, line number 38, please insert the word -- first -- between “the” and “plurality”.

At column 6, claim number 16, line number 62, please delete the word “first”.

Signed and Sealed this
Nineteenth Day of July, 2011

David J. Kappos
*Director of the United States Patent and Trademark Office*